US011313350B2

(12) United States Patent
Ravn

(10) Patent No.: US 11,313,350 B2
(45) Date of Patent: Apr. 26, 2022

(54) WIND-DRIVEN ENERGY CONVERTING DEVICE

(71) Applicant: Niels Ravn, Roskilde (DK)

(72) Inventor: Niels Ravn, Roskilde (DK)

( * ) Notice: Subject to any disclaimer, the term of this patent is extended or adjusted under 35 U.S.C. 154(b) by 0 days.

(21) Appl. No.: 16/826,782

(22) Filed: Mar. 23, 2020

(65) Prior Publication Data
US 2021/0071636 A1    Mar. 11, 2021

Related U.S. Application Data

(63) Continuation of application No. PCT/EP2018/077811, filed on Oct. 11, 2018.

(30) Foreign Application Priority Data

Oct. 11, 2018   (DK) .............................. PA201700569

(51) Int. Cl.
| | |
|---|---|
| *F03D 5/00* | (2006.01) |
| *H02K 7/10* | (2006.01) |
| *H02K 7/116* | (2006.01) |
| *H02K 7/18* | (2006.01) |

(52) U.S. Cl.
CPC .......... *F03D 5/005* (2013.01); *H02K 7/1004* (2013.01); *H02K 7/116* (2013.01); *H02K 7/183* (2013.01); *F05B 2240/60* (2013.01); *F05B 2250/42* (2013.01)

(58) Field of Classification Search
CPC ......... F03D 5/005; F03D 5/06; H02K 7/1004; H02K 7/116; H02K 7/183; F05B 2240/60; F05B 2250/42; F05B 2260/40; Y02E 10/70

USPC ...................................... 290/1 R; 185/29, 30
See application file for complete search history.

(56) References Cited

U.S. PATENT DOCUMENTS

| | | | | |
|---|---|---|---|---|
| 512,764 | A | * | 1/1894 | Teate ........................ F03G 3/00 185/29 |
| 2,593,467 | A | * | 4/1952 | Maar ...................... B60K 25/10 185/29 |
| 3,258,979 | A | * | 7/1966 | Alsept .................... G09B 23/10 74/63 |
| 4,266,143 | A | | 5/1981 | Ng |

(Continued)

FOREIGN PATENT DOCUMENTS

| | | |
|---|---|---|
| AU | 2011202488 B2 | 9/2011 |
| BR | PI0407109 B1 | 4/2014 |

(Continued)

*Primary Examiner* — Julio C. Gonzalez
(74) *Attorney, Agent, or Firm* — Lambert Shortell & Connaughton; David J. Connaughton, Jr.; Justin P. Tinger

(57) ABSTRACT

Wind-driven energy converting device (2) is disclosed. The wind-driven energy converting device (2) comprises a main pendulum (20) comprising a pendulum bob (10) attached to a pendulum rod (6). A sail member (4) attached to the pendulum rod (6) in a higher position than the pendulum rod (6). The main pendulum (20) is suspended in a frame (8) by means of a bearing unit (18) allowing the pendulum rod (6) to be rotated about two perpendicular horizontal axes (X, Y) at the same time. The main pendulum (20) is mechanically attached to at least one secondary pendulum (14) by means of a connection structure (16). The secondary pendulum (14) is connected to and being configured to rotate a driving shaft (36) upon being moved due to motion of the main pendulum (20).

17 Claims, 7 Drawing Sheets

(56) References Cited

U.S. PATENT DOCUMENTS

| | | | |
|---|---|---|---|
| 4,452,045 A * | 6/1984 | Matlin | F04B 17/006 |
| | | | 136/291 |
| 4,672,222 A | 6/1987 | Ames | |
| 6,139,255 A | 10/2000 | Vauthier | |
| 6,537,018 B2 | 3/2003 | Streetman | |
| 7,315,092 B2 | 1/2008 | Cook | |
| 7,352,073 B2 | 4/2008 | Ames | |
| 7,397,144 B1 | 7/2008 | Brostmeyer | |
| 7,453,165 B2 | 11/2008 | Hench | |
| 8,177,480 B2 | 5/2012 | Petrounevitch | |
| 2006/0263198 A1 | 11/2006 | Kinkaid | |
| 2007/0035134 A1 * | 2/2007 | Bristow | H02K 7/1853 |
| | | | 290/1 R |
| 2009/0295293 A1 | 12/2009 | Lawton | |
| 2011/0018275 A1 | 1/2011 | Sidenmark | |
| 2011/0285128 A1 | 11/2011 | Hobdy | |
| 2012/0201676 A1 * | 8/2012 | Krietzman | F03D 80/00 |
| | | | 416/1 |
| 2013/0207403 A1 * | 8/2013 | Eichhorn | F03G 3/06 |
| | | | 290/1 R |
| 2017/0198679 A1 * | 7/2017 | Kempkey | F03D 1/04 |

FOREIGN PATENT DOCUMENTS

| | | |
|---|---|---|
| CN | 101589223 B | 10/2011 |
| DE | 60211682 T2 | 4/2007 |
| EP | 1878912 A1 | 1/2008 |
| ES | 2240768 T3 | 10/2005 |
| JP | 4758983 B2 | 8/2011 |
| KR | 100269764 B1 | 10/2000 |
| KR | 20110051128 A | 5/2011 |
| KR | 101377696 B1 | 3/2014 |
| WO | 2003004869 A1 | 1/2003 |

* cited by examiner

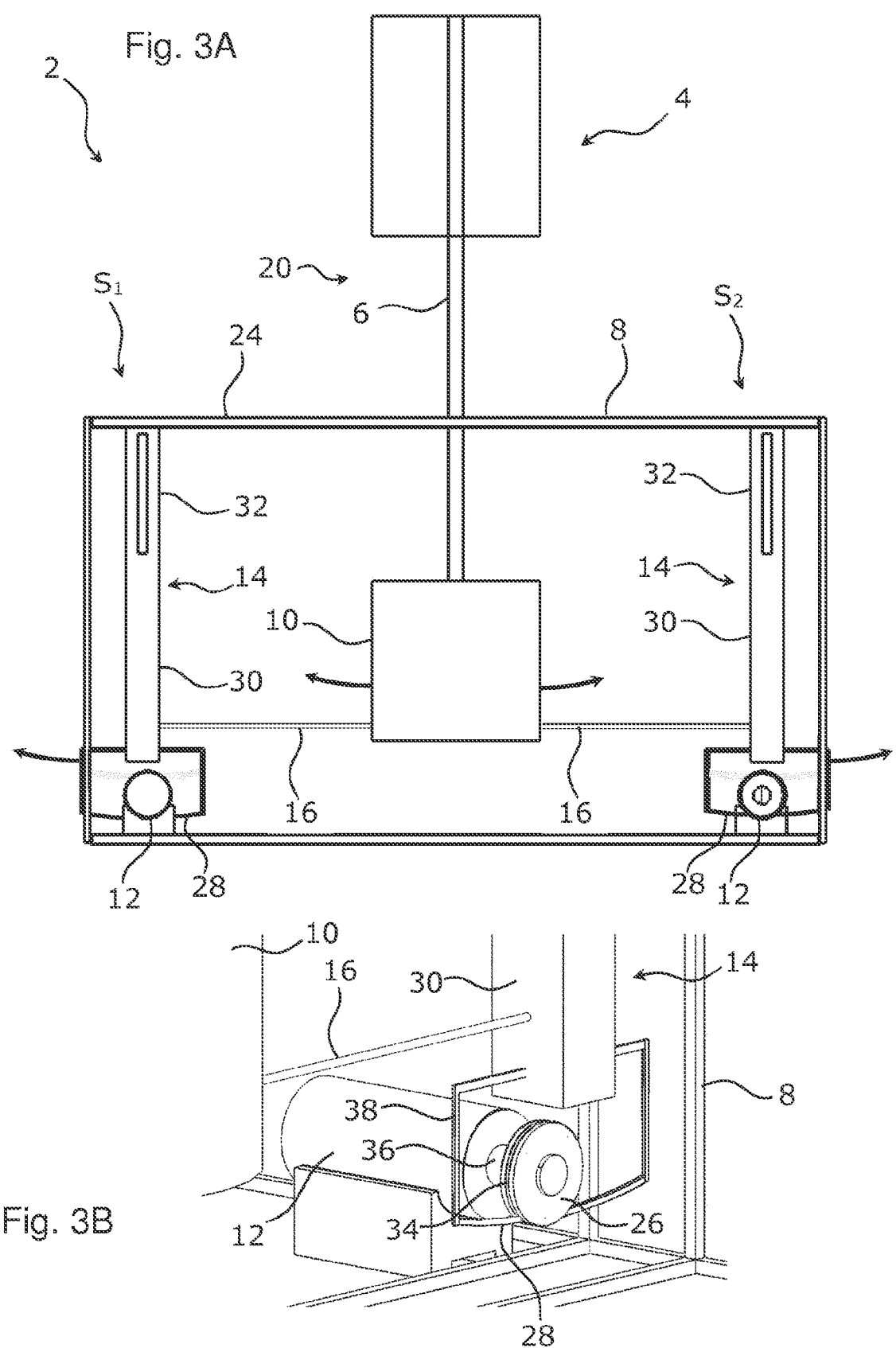

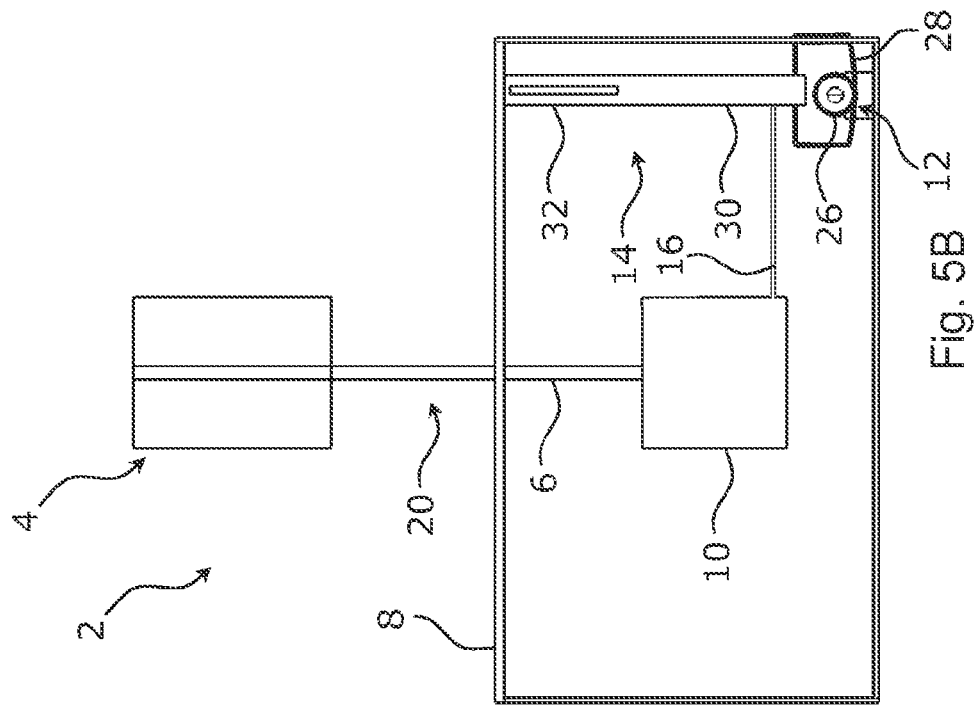
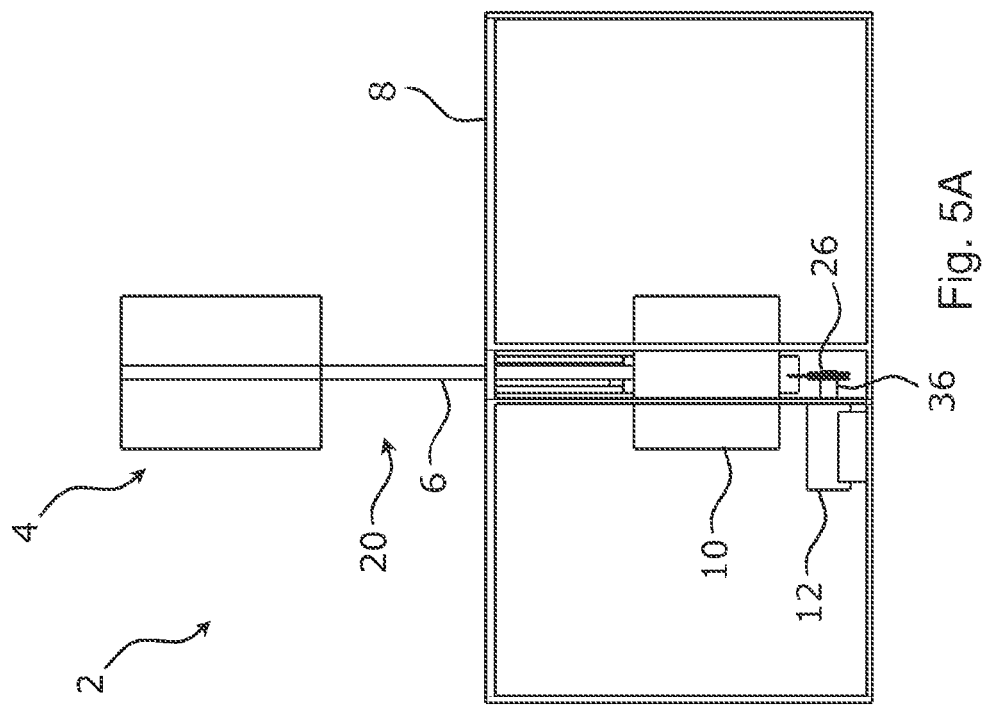

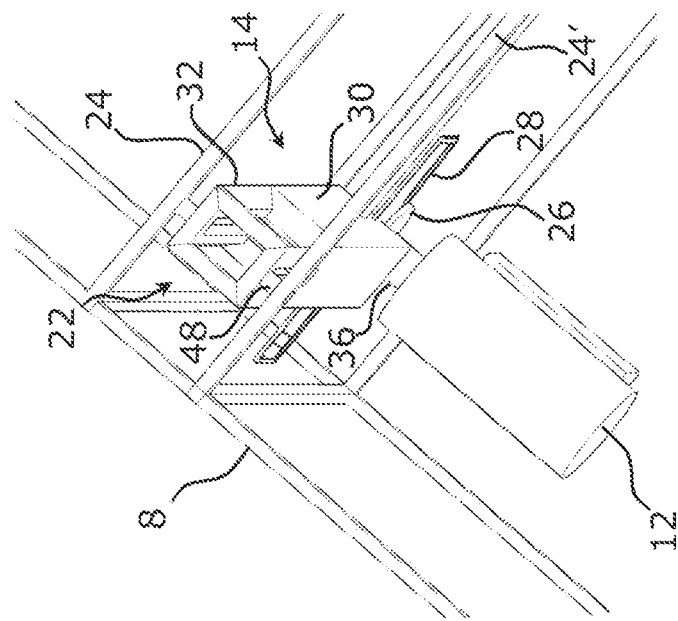
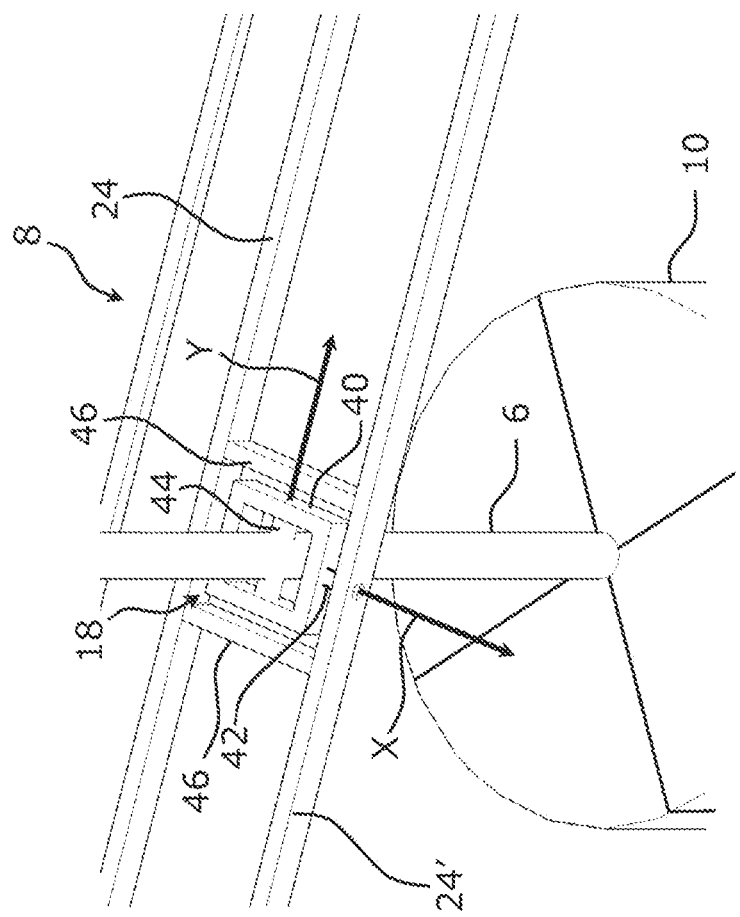

WIND-DRIVEN ENERGY CONVERTING DEVICE

FIELD OF INVENTION

The present invention relates to a wind-driven energy converting device comprising a main pendulum being suspended in a frame by means of a bearing unit allowing the pendulum rod to be rotated about two perpendicular horizontal axes at the same time. The invention more particularly relates to a wind-driven energy converting device that is mechanically connected to and being configured to rotate a driving shaft upon being moved due to motion of the main pendulum.

PRIOR ART

Several types of wind-driven energy converting devices configured to convert wind energy to electricity or rotation of a driving shaft are known. Among these types of wind-driven energy converting devices, a particular group comprise a main pendulum suspended in a frame by means of a bearing unit allowing the pendulum rod to be rotated about two perpendicular horizontal axes at the same time.

E.g. from WO 2012/066550 A1, a device for use in extracting energy from an incoming fluid flow is known. The device comprises an oscillator assembly mounted on a base, wherein the oscillator assembly comprises a main body exposed to an incoming fluid flow. A joining element is attached to the main body and configured for anchoring the main body to the base and enabling oscillation of the main body with respect to the base. An operative flow affecting unit comprising at least one flow interacting element is located on the surface of the main body to affect a separation of streams of the fluid flowing over the surface of the main body. The fluid flow may be e.g. wind or water. The device is a pendulumlike rod suited for capturing the kinetic energy of the fluid flow and may drive one or more linear generators, compressors or the like. The device may move around the X axis and the Y axis. However, the device has only one pendulum, thereby compromising a more stable and uniform energy production.

One of the drawbacks of the known group of wind-driven energy converting devices are that the energy production rate fluctuates largely as function of time. Accordingly, it would be desirable to be able to provide a wind-driven energy converting device that is configured to generate energy in a more stable rate.

Therefore, it is an object of the present invention to provide a wind-driven energy converting device in which the energy production rate is more constant than in the prior art wind-driven energy converting devices comprising a main pendulum suspended in a frame by means of a bearing unit allowing the pendulum rod to be rotated about two perpendicular horizontal axes at the same time.

SUMMARY OF THE INVENTION

The object of the present invention can be achieved by a wind-driven energy converting device as defined in claim 1. Preferred embodiments are defined in the dependent sub claims, explained in the following description and illustrated in the accompanying drawings.

The wind-driven energy converting device according to the invention is a wind-driven energy converting device comprising a main pendulum comprising a pendulum bob attached to a pendulum rod, wherein a sail member is attached to a the pendulum rod in a higher position than the pendulum rod, wherein the main pendulum is suspended in a frame by means of a bearing unit allowing the pendulum rod to be rotated about two perpendicular horizontal axes at the same time, wherein the main pendulum is mechanically attached to at least one secondary pendulum by means of a connection structure, wherein the secondary pendulum is connected to and being configured to rotate a driving shaft upon being moved due to motion of the main pendulum.

Hereby, it is possible to provide a wind-driven energy converting device in which the energy production rate is more constant than in the prior art wind-driven energy converting devices comprising a main pendulum suspended in a frame by means of a bearing unit allowing the pendulum rod to be rotated about two perpendicular horizontal axes at the same time.

The wind-driven energy converting device comprises a main pendulum comprising a pendulum bob attached to a pendulum rod. The pendulum bob may be made as a massive body. In one embodiment according to the invention, the pendulum bob is cast in concrete. However, it is possible to make the pendulum bob in metal, stone or another material. The pendulum bob is preferably made in a material having a density that is larger than the density of water, preferably at least twice as large as the density of water. It may be beneficial that the pendulum bob is made in a material having a density that is more than five times larger than the density of water. The pendulum bob may be a one-piece body. Alternatively, the pendulum bob may comprise several parts being attached to one another.

The sail member is attached to the pendulum rod in a higher position than the pendulum rod. Hereby, the wind can make the pendulum swing from side to side, hereby converting the wind energy to kinetic energy of the pendulum.

The main pendulum is suspended in a frame. The frame preferably comprises two or more horizontally extending rods, to which it is possible to attach the bearing unit configured to allow the pendulum rod to rotate about two perpendicular horizontal axes at the same time.

The main pendulum is mechanically attached to at least one secondary pendulum by means of a connection structure. The connection structure may be a wire, preferably a metal wire. Alternatively, the connection structure may be a chain or a string. In one embodiment according to the invention, the connection structure is a rod.

The secondary pendulum is connected to and being configured to rotate a driving shaft upon being moved due to motion of the main pendulum.

The shaft may be used to drive any suitable device including a generator or a pump.

It may be an advantage that the pendulum bob of the main pendulum is connected to the pendulum bob.

Alternatively, the pendulum bob of the main pendulum can be connected to the pendulum rod of the secondary pendulum.

In one preferred embodiment according to the invention the connection structure is a wire.

In another embodiment according to the invention the connection structure is a string.

In a further embodiment according to the invention the connection structure is a chain.

It may be advantageous that the wind-driven energy converting device comprises a frame comprising a plurality of rods.

It may be beneficial that the wind-driven energy converting device comprises a frame comprising a plurality of rods, wherein some of the rods extend parallel to each other ad where some of the rods extend perpendicular to each other. Hereby, it is possible to create a frame having large stability.

It may be an advantage that the pendulum rod of the main pendulum is suspended to the frame by means of a bearing unit attached to two rods of the frame. Hereby, a reliably and strong attachment can be provided.

It may be beneficial that the pendulum rod of the main pendulum is suspended to the frame by means of a bearing unit attached to two parallel rods of the frame. Hereby, the attachment can be eased.

In one embodiment of the invention, the wind-driven energy converting device comprises two sections, wherein each section is connected to the pendulum bob of the main pendulum and wherein each section comprises a separate secondary pendulum configured to make a driving shaft rotate upon movement of the secondary pendulum.

In another embodiment of the invention, the wind-driven energy converting device comprises three sections, wherein each section is connected to the pendulum bob of the main pendulum and wherein each section comprises a separate secondary pendulum configured to make a driving shaft rotate upon movement of the secondary pendulum.

In another embodiment of the invention the wind-driven energy converting device comprises four sections, wherein each section is connected to the pendulum bob of the main pendulum and wherein each section comprises a separate secondary pendulum configured to make a driving shaft rotate upon movement of the secondary pendulum.

It may be an advantage that the wind-driven energy converting device comprises a generator mechanically connected to the driving shaft hereby being configured to generate electrical energy upon rotation of the main pendulum. Hereby, the wind-driven energy converting device can generate electrical energy.

It may be beneficial that the wind-driven energy converting device comprises an engagement structure configured to engage with a corresponding engagement portion provided at or attached to the driving shaft. Hereby, kinetic energy can be transferred from the secondary pendulum to the driving shaft.

It may be an advantage that the engagement structure is attached to the pendulum bob of the secondary pendulum.

It may be beneficial that the engagement structure is attached to the pendulum bob of the secondary pendulum by means of a fixture.

In a preferred embodiment according to the invention the wind-driven energy converting device comprises a sail member having four sail segments. It may be preferred that the sail segments are provided in a configuration in which they extend along two vertical plane extending perpendicular to each other. Hereby, the wind can be used regardless of the direction of the wind.

In some embodiments, one or more of the sail segments comprises two parts being movable relative to each other. Each of the parts may be provided with apertures. The apertures on the two parts are preferably formed so as to cover each other when the two parts are in a retracted position. When the two parts are moved apart from (extended relative to) each other, an opening or openings is/are provided between the two parts. Thereby, more energy may be harvested from the wind-driven energy converting device. The apertures may take e.g. the form of slots (e.g. rectangular or squares) or circular carvings. Furthermore, the wind-driven energy converting device may be provided with means for adjusting the movable parts of the sail segments. Such means may include weights, electronic regulation means, as well as other conventionally known means for regulating parts relative to each other.

It may be advantageous that the wind-driven energy converting device comprises a plurality of sections each provided with a secondary pendulum comprising a pendulum bob suspended to the frame by means of a pendulum rod rotatably attached to the frame by means of a bearing unit, wherein the sections protrude radially from main pendulum being the centrally arranged. Hereby, a very compact design can be achieved.

It may be an advantage that the sections extend along vertical planes extending perpendicular or parallel to each other.

Hereby, a two-dimensional swing motion of the secondary pendulums can be achieved.

It may be preferred that the sail member is detachably attached to the pendulum rod of the main pendulum. Hereby, the range of motion of the main pendulum can be regulated. This may be an advantage if the wind speed is very high or very low compared to the normal wind speed.

It may be advantageous that the sail member is slidably attached to the pendulum rod of the main pendulum. Hereby, the vertical position of the sail member can be adjusted. This may be an advantage because the position of the sail member determines the torque generated by a given wind speed.

The pendulum bob of the main pendulum may preferably be segmented. Hereby the weight of each portion of the pendulum bob can be reduced. This is beneficial when the pendulum bob is handled manually.

It may be beneficial that the wind-driven energy converting device comprises a locking structure configured to lock one or more of the pendulum bobs in a position or in a range of positions. This may be done by using one or more chains, wires or rods.

In one embodiment according to the invention the wind-driven energy converting device is modular and configured to be assembled and disassembled so that the wind-driven energy converting device can be moved and assembled in a new location.

It may be advantageous that the wind-driven energy converting device comprises a bearing unit by which the main pendulum of a wind-driven energy converting device according to the invention is attached to the frame, said bearing unit comprising a ring rotatably attached to the pendulum rod of the main pendulum by means of a pivot extending at least partly through the pendulum rod and being attached to the ring, wherein the ring is rotatably attached to the frame by means of one or more pivots.

The pivot preferably extends along a horizontal axis.

In a preferred embodiment according to the invention the wind-driven energy converting device comprises a mechanical rotational converting device configured to transfer two alternating opposite directed rotational motions of a main shaft to a one-way rotational motion. This is in particular, an advantage when the rotational motion of the energy converting device according to the invention is used to produce electrical energy by means of a generator or to drive a pump.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 3A shows a side view of a further wind-driven energy converting device according to the invention;

FIG. 3B shows a close-up view of a generator of a wind-driven energy converting device according to the invention and the structures surrounding it;

FIG. 5A shows a front view of a wind-driven energy converting device according to the invention;

FIG. 5B shows a side view of the wind-driven energy converting device shown in FIG. 5A;

FIG. 6A shows a close-up, perspective view of a bearing unit by which the main pendulum of a wind-driven energy converting device according to the invention is attached to a frame;

FIG. 6B shows a close-up, perspective view of another bearing unit by which a secondary pendulum of a wind-driven energy converting device according to the invention is attached to a frame

DETAILED DESCRIPTION OF THE INVENTION

Figure 1:
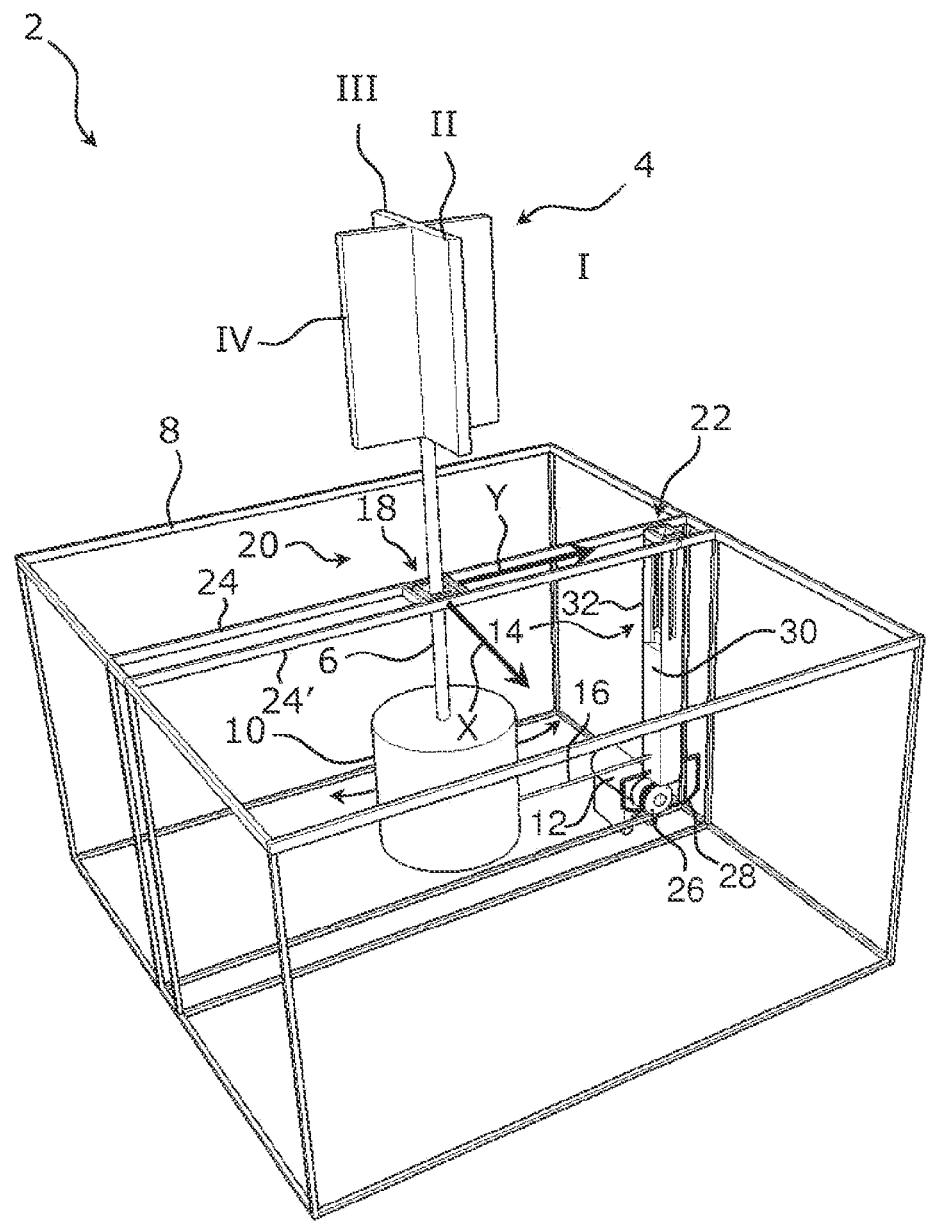
FIG. 1 shows a perspective view of a wind-driven energy converting device according to the invention.

Referring now in detail to the drawings for the purpose of illustrating preferred embodiments of the present invention, a wind-driven energy converting device 2 of the present invention is illustrated in FIG. 1.

FIG. 1 illustrates a perspective view of a wind-driven energy converting device 2 according to the invention. The wind-driven energy converting device 2 comprises a main pendulum 20 suspended in a frame 8 by means of a bearing unit 18 allowing the pendulum rod 6 of the main pendulum 20 to be rotated about two perpendicular horizontal axes X, Y. The bearing unit 18 is attached to two parallel rods 24, 24' and is shown in further detail in FIG. 6A.

The wind-driven energy converting device 2 comprises a sail member 4 attached to the top portion of the pendulum rod 6. The sail member 4 comprises four sail elements I, II, III, IV each shaped as a rectangular plate arranged in an upright configuration. The four sail elements I, II, III, IV extend perpendicular to each other. Hereby, the four sail elements I, II, III, IV are configured to catch the wind regardless of its direction. The first sail element I extends along the second axis Y. The second sail element II extends along the first axis X. The third sail element III extends along the second axis Y and the fourth sail element IV extends along the first axis X. The four sail elements I, II, III, IV have the same size and geometry. The sail elements I, II, III, IV may be produced in any suitable material, preferably a plate material such as metal, wood or fiber-reinforced plastic. The four sail elements I, II, III, IV may be made as a one-piece body or as two or more separate sections configured to be attached to each other e.g. by means of an attachment structure (not shown).

The wind-driven energy converting device 2 comprises a secondary pendulum 14 comprising a pendulum bob 30 attached to a pendulum rod 32 rotatably attached to the rods 24, 24' by means of a bearing unit 22. A close-up view of the bearing unit 22 is shown in 6B.

The pendulum bob 10 of the main pendulum 20 is attached to the pendulum bob 30 of the secondary pendulum 14 by means of a connection structure 16 shaped as a wire 16. The connection structure 16 may be a chain or a string. In one embodiment according to the invention the connection structure 16 may be shaped as a flexible rod or a stiff rod.

The connection structure 16 is attached to the pendulum bob 30 of the secondary pendulum 14, however, the connection structure 16 may alternatively be attached to the pendulum rod 32 of the secondary pendulum 14. Likewise, it is possible to attach the connection structure 16 to the pendulum rod 6 of the main pendulum 20 and to pendulum bob 30 of the secondary pendulum 14. Alternatively, the connection structure 16 can be connected to the pendulum rod 6 of the main pendulum 20 and to pendulum rod 32 of the secondary pendulum 14.

An engagement structure 28 formed as a toothed arced rod is attached to the pendulum bob 30 of the secondary pendulum 14 by means of a fixture (see FIG. 3B and FIG. 6B). The engagement structure 28 is brought into engagement with corresponding engagement structures (e.g. provided in an annular groove) of a wheel 26 connected to a generator 12. Accordingly, motion of the pendulum bob 10 of the main pendulum 20 will cause the pendulum bob 30 of the secondary pendulum 14 to swing sideways (along the first axis X). Therefore, the engagement structure 28 will be moved along the first axis X and hereby causing the wheel 26 to be rotated. Accordingly, the generator 12 will generate electrical energy. The wind-driven energy converting device 2 may be part of a system comprising a converter capable of converting the produced electrical power to e.g. an alternating current that can be supplied to the grid. Alternatively, the produced electrical power can be stored in any suitable storage means including batteries.

Instead of a generator 12, the pendulum bob 30 of the secondary pendulum 14 bay be connected to another structure such as a shaft driving a pump in order to supply drinking water to a village or a private household.

The wind-driven energy converting device 2 comprises only one secondary pendulum 14. It is, however, possibly to provide the wind-driven energy converting device 2 with two, three or four secondary pendulums 14.

The wind-driven energy converting device 2 comprises a frame 8 providing stability. The frame 8 may be arranged inside a shed or be arranged in a hole in the ground.

Figure 2:
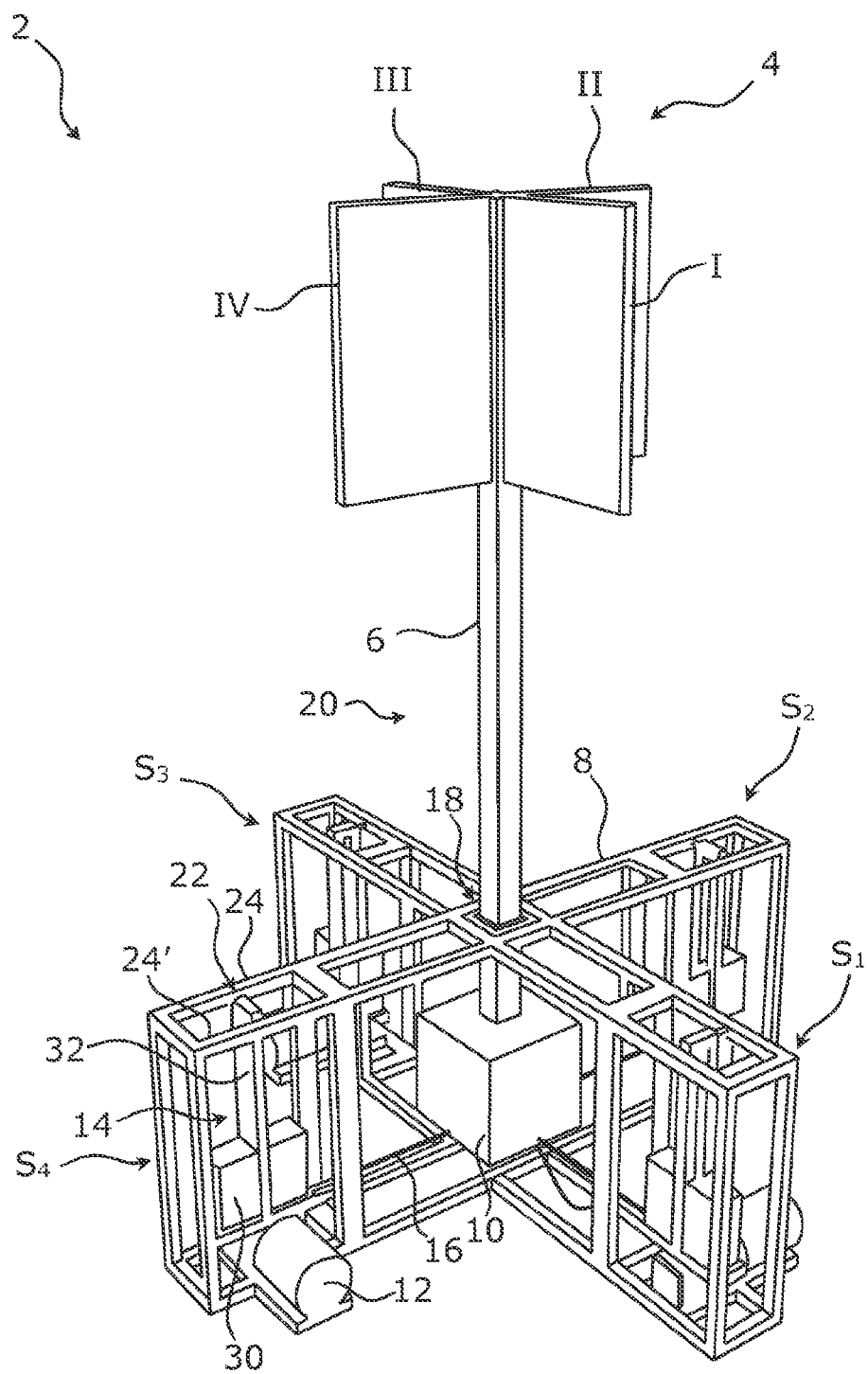
FIG. 2 shows a perspective view of another wind-driven energy converting device according to the invention.

FIG. 2 illustrates a perspective view of another wind-driven energy converting device 2 according to the invention. The wind-driven energy converting device 2 comprises a main pendulum 20 suspended in a frame 8 by means of a bearing unit 18 allowing the pendulum rod 6 of the main pendulum 20 to be rotated about two perpendicular horizontal axes, just like the one shown in FIG. 1. The bearing unit 18 is attached to two rods 24, 24' provided in the top portion of the frame 8.

The wind-driven energy converting device 2 comprises four sections $S_1$, $S_2$, $S_3$, $S_4$ each provided with a secondary pendulum 14 comprising a pendulum bob 30 suspended to the frame 8 by means of a pendulum rod 32 rotatably attached to the two rods 24, 24' provided in the top portion of the frame 8 by means of a bearing unit 22. The sections $S_1$, $S_2$, $S_3$, $S_4$ protrude radially from the centrally arranged main pendulum 20. The sections extend along vertical planes extending perpendicular to each other. Accordingly, each opposite pairs of sections extend parallel to each other.

Each pendulum bob 30 of the four sections $S_1$, $S_2$, $S_3$, $S_4$ is connected to the pendulum bob 10 of the main pendulum 20 by a wire 16.

Each pendulum bob 30 is connected to a driving shaft. The driving shaft is connected to a generator 12 in such a manner that kinetic energy from the swinging pendulum bob 30 will be converted into electrical energy generated by the generator 12. Instead of being connected to a generator 12, the shaft may be connected to another device, e.g. a pump.

A sail member 4 corresponding to the on shown in FIG. 1, is attached to the top portion of the pendulum rod 6 of the main pendulum 20. Each sail element I, II, III, IV extend parallel to one of the four sections $S_1$, $S_2$, $S_3$, $S_4$.

FIG. 3A illustrates a side view of a further wind-driven energy converting device 2 according to the invention. The wind-driven energy converting device 2 comprises a main pendulum 20 suspended in a frame 8 by means of a bearing unit allowing the pendulum rod 6 of the main pendulum 20 to be freely rotated (accordingly, the pendulum rod 6 of the main pendulum 20 can be rotated with respect to two perpendicular horizontal axes). The bearing unit is attached to the frame 8 of the wind-driven energy converting device 2.

The wind-driven energy converting device 2 comprises a first section Si and a second first section $S_2$ each being provided with a secondary pendulum 14 comprising a pendulum bob 30 suspended to the frame 8 by means of a pendulum rod 32 rotatably attached to the frame 8. The sections $S_1$, $S_2$ protrude radially from the centrally arranged main pendulum 20 and away from each other. Each pendulum bob 30 of the four sections $S_1$, $S_2$ is connected to the pendulum bob 10 of the main pendulum 20 by means of a wire 16.

Each pendulum bob 30 is connected to a driving shaft of an electrical generator 12. Accordingly, kinetic energy from the swinging pendulum bob 30 of the secondary pendulums 14 will be converted into electrical energy generated by the generator 12. It is, however, possible to connect the shaft to another device, e.g. a pump, instead of connecting the shaft to an electrical generator 12.

The wind-driven energy converting device 2 comprises a sail member 4 corresponding to the one shown in FIG. 1 and FIG. 2. The sail member 4 is attached to the top portion of the pendulum rod 6 of the main pendulum 20. The sail member 4 comprises four sail elements, two of which extend parallel to the sections $S_1$, $S_2$ of the wind-driven energy converting device 2. An engagement structure 28 formed as a toothed arced rod is attached to the pendulum bob 30 of the secondary pendulum 14 by means of a fixture. The engagement structure 28 is brought into engagement with an annular groove provided in a wheel attached to the shaft of the electrical generator 12. Hereby, the engagement structure 28 can be used to transfer mechanical energy from the secondary pendulum 14 to the generator 12.

FIG. 3B illustrates a close-up view of an electrical generator 12 of a wind-driven energy converting device 2 according to the invention and the structures surrounding it. The electrical generator 12 comprises a shaft 36 and a wheel 26 attached thereto. The wheel 26 is provided with an annular groove 34 configured to engagingly receive an engagement structure 28 formed as a toothed arced rod being attached to the pendulum bob 30 of the secondary pendulum 14 by means of a fixture 38. The electrical generator 12 rests on a stand provided to support the electrical generator 12 at the bottom portion of the frame 8.

The pendulum bob 30 of the secondary pendulum 14 is attached to the pendulum bob 10 of the main pendulum by means of a wire 16. Accordingly, the pendulum bob 10 of the main pendulum can pull the pendulum bob 30 of the secondary pendulum 14 and hereby make it swing. Accordingly, motion of the pendulum bob 10 of the main pendulum initiates motion of the pendulum bob 30 of the secondary pendulum 14, which will cause the shaft 36 to rotate so that the electrical generator will produce electrical energy. The pendulum bob 30 of the secondary pendulum 14 will swing to the right and to the left, the shaft 36 of the electrical generator 12 will rotate clockwise and anticlockwise in an alternating sequence.

Figure 4A:
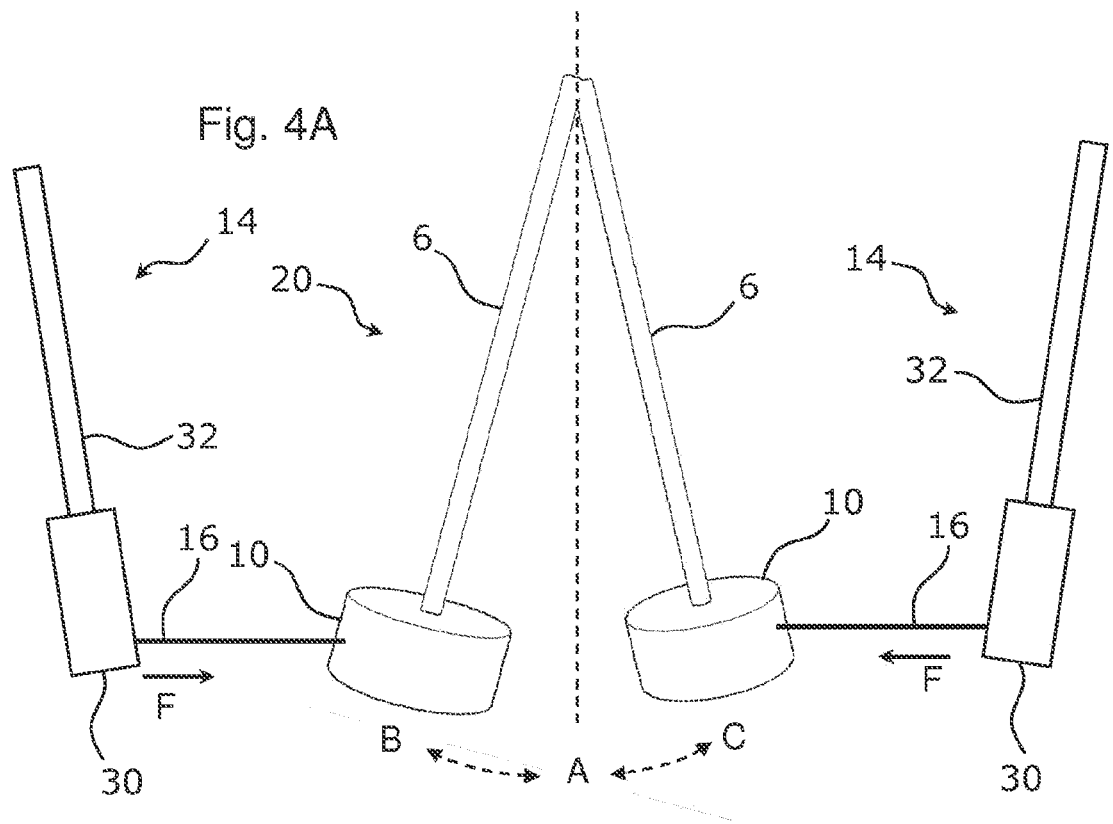
FIG. 4A shows a side view of a main pendulum of a wind-driven energy converting device according to the invention.

FIG. 4A illustrates a side view of a main pendulum 20 of a wind-driven energy converting device 2 according to the invention. It can be seen, that the main pendulum 20 comprises a pendulum bob 10 attached to the bottom portion of a pendulum rod 6 being suspended in its top portion. The pendulum bob 10 is swinging between two positions B, C. A third position A is achieved at the midpoint between the two positions B, C. At the position A, the pendulum rod 6 extends vertically.

A first connection structure 16 (e.g. a wire) is attached to a first side of the pendulum bob 10 and to the pendulum bob 30 of a first secondary pendulum 14. A second connection structure 16 (e.g. a wire) is attached to the opposite side of the pendulum bob 10 and to the pendulum bob 30 of a second secondary pendulum 14. Accordingly, a force F will be exerted to the pendulum bob 30 attached to the end of the connection structures 16. The pendulum bob 30 of each secondary pendulum 14 is connected to a shaft (not shown). In one embodiment according to the invention the shaft may be a shaft of an electrical generator. In another embodiment according to the invention the shaft may be configured to drive an external device such as a pump.

Figure 4B:
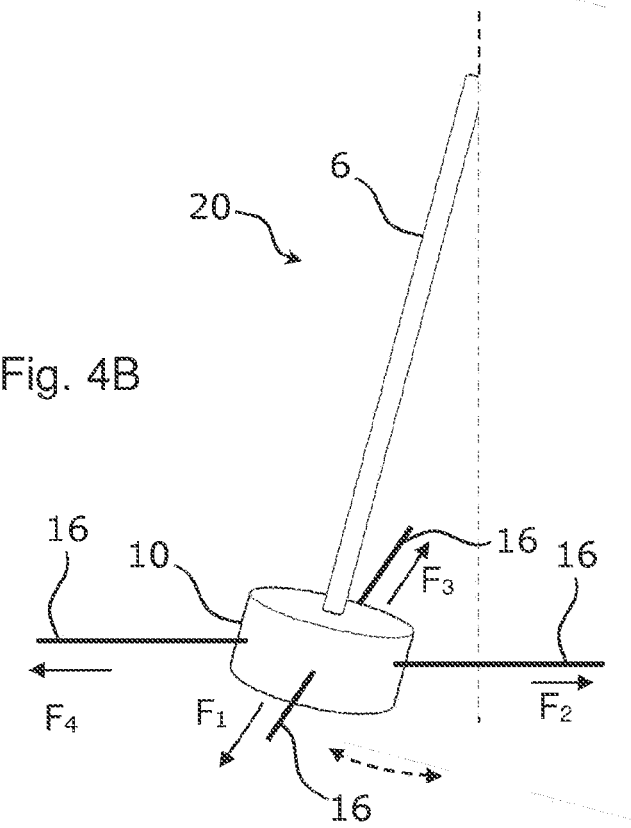
FIG. 4B shows a side view of a main pendulum of another wind-driven energy converting device according to the invention.

FIG. 4B illustrates a side view of a main pendulum 20 of another wind-driven energy converting device 2 according to the invention. The wind-driven energy converting device 2 comprises a pendulum bob 10 attached to the free end of a pendulum rod 6 being suspended in a manner, in which the pendulum rod 6 can be freely rotated about several horizontal axes. A free rotation can be achieved by attaching the pendulum rod 6 in a spherical in a bearing unit as shown in FIG. 6A.

A first connection structure 16 (a wire) is attached to a first side of the pendulum bob 10 and to the pendulum bob of a first secondary pendulum (not shown). A second connection structure 16 (a wire) is attached to the opposite side of the pendulum bob 10 and to a pendulum bob of a second secondary pendulum (not shown). A third connection structure 16 (a wire) is attached pendulum bob 10 in a position between the first and the second connection structure 16 and to a pendulum bob of a third secondary pendulum (not shown). A fourth connection structure 16 (a wire) is attached to pendulum bob 10 at the opposite position than the third connection structure 16 and to a pendulum bob of a fourth secondary pendulum (not shown).

Hereby, the pendulum bob 10 of the main pendulum 20 is capable of transferring mechanical energy to each of the four secondary pendulums. As indicated in FIG. 4B, different forces $F_1$, $F_2$, $F_3$, $F_4$ may be exerted by the pendulum bob 10 of the main pendulum 20 to each of the four secondary pendulums (not shown).

FIG. 5A illustrates a front view of a wind-driven energy converting device 2 according to the invention, wherein FIG. 5B illustrates a side view of the wind-driven energy converting device shown in FIG. 5A. The wind-driven energy converting device 2 comprises a main pendulum 20 suspended in a frame 8 by means of a bearing unit allowing the pendulum rod 6 of the main pendulum 20 to be freely rotated with respect to two perpendicular horizontal axes. The bearing unit is attached to a top portion of the frame 8 of the wind-driven energy converting device 2.

The wind-driven energy converting device 2 comprises a single secondary pendulum 14 comprising a pendulum bob 30 suspended to the frame 8 by means of a pendulum rod 32 rotatably attached to the frame 8. The pendulum bob 30 is connected to a driving shaft 36 of an electrical generator 12 by means of an engagement structure 28 engaging a wheel 26 attached to the shaft 36, wherein the engagement structure 28 is fixed to the pendulum bob 30 by a fixture. Accordingly, kinetic energy from the pendulum bob 30 of the secondary pendulums 14 (when it is swinging) will be converted into electrical energy generated by the generator 12.

The wind-driven energy converting device 2 comprises a sail member 4 corresponding to the one shown in FIG. 1 and FIG. 2. The sail member 4 is attached to the top portion of the pendulum rod 6 of the main pendulum 20. The sail member 4 preferably comprises four sail elements. The engagement structure 28 is formed as a toothed arced rod. Alternatively, it is possibly to transfer mechanical energy from the swing secondary pendulum 14 to the generator by other structures, e.g.:
a) engaging gears;
b) a toothed belt engaging with a threaded wheel or
c) a chain engaging with a toothed wheel.

FIG. 6A illustrates shows a close-up, perspective view of a bearing unit 18 by which the main pendulum of a wind-driven energy converting device according to the invention is attached to a frame 8. The wind-driven energy converting device comprises a pendulum bob 10 having a cylindrical shape segmented into four portions for easing the handling (reducing the weight of each portion) of the pendulum bob 10. The pendulum bob 10 is attached to the bottom end of a pendulum rod 6. The pendulum rod 6 is rotatably attached to a square ring 40 by means of a pivot 44 extending through the pendulum rod 6 and being attached to the ring 40. The pivot 44 extends along a horizontal axis Y.

The ring 40 is rotatably attached to two rods 24, 24' of the frame 8 by means of a pivot 42 extending along an additional horizontal axis X extending perpendicular to the other horizontal axis Y. Hereby, the pendulum rod 6 can be rotated about the two axes X, Y at the same time.

Two reinforcement structures 46 formed as rods connect the two rods 24, 24' of the frame.

FIG. 6B illustrates a close-up, perspective view of another bearing unit 22 by which a secondary pendulum 14 of a wind-driven energy converting device according to the invention is attached to a frame 8. The secondary pendulum 14 comprises a pendulum bob 30 fixed to a pendulum rod 32 rotatably attached to two parallel rods 24, 24' of the frame by means of the bearing unit 22. The bearing unit 22 comprises a pivot 48 attached to the top portion of the pendulum rod 32 and the two parallel rods 24, 24'.

An engagement structure 28 is attached to the pendulum bob 30 by means of a fixture. The engagement structure 28 is formed as a toothed arced rod that is brought into engagement with a corresponding annular groove provided in a wheel 26 attached to the shaft 36 of a generator 12. Therefore, motion of the pendulum bob 30 of the secondary pendulum 14 can be converted to electrical energy generated by the generator 12.

Figure 7:
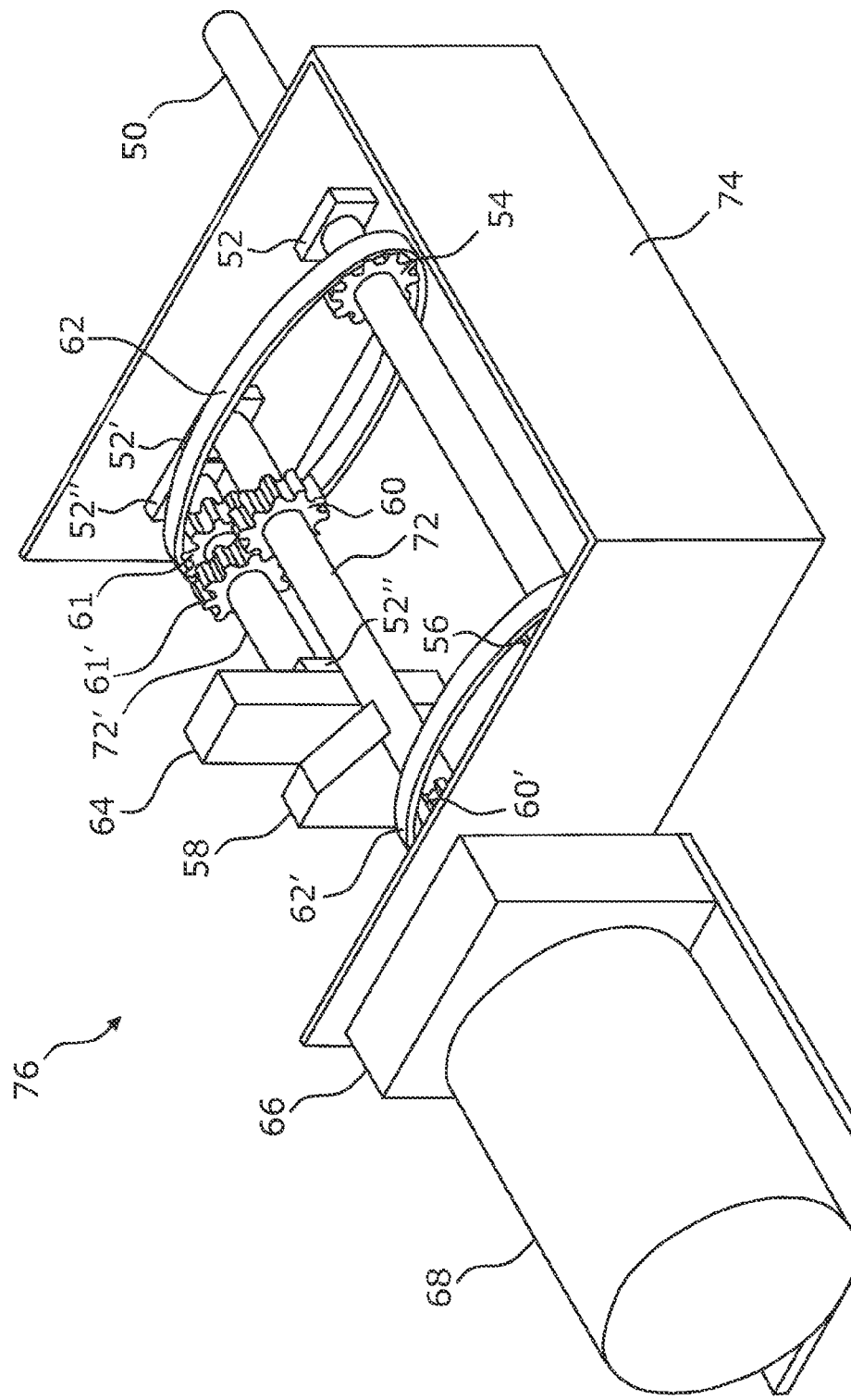
FIG. 7 shows a perspective view of a rotational converting device according to the invention.

FIG. 7 illustrates a mechanical rotational converting device 76 configured to transfer two alternating opposite directed rotational motions of a main shaft 50 to a one-way rotational motion. This is, in particular an advantage when the rotational motion of the energy converting device according to the invention is used to produce electrical energy by means of a generator 68.

The rotational converting device 76 is mechanically comprises a main shaft 50 that is mechanically connected to the driving shaft to which at least one secondary pendulum is connected for driving said driving shaft. In one embodiment according to the invention, the main shaft 50 of the rotational converting device 76 corresponds to the driving shaft. In another embodiment the driving shaft is mechanically connected to the main shaft 50 of the rotational converting device 76.

In FIG. 7, however, the main shaft 50 of the rotational converting device 76 corresponds to the driving shaft of the energy converting device according to the invention. The shaft 50 of the rotational converting device 76 is rotatably attached to a housing 74 by means of a bearing 52 (another bearing attached to the housing 74 may preferably be provided in the distal end of the shaft 50).

A first freewheel 54 is attached to the shaft 50 in a first end of that part of the shaft 50 that extends through the housing 74. The first freewheel 54 only engages the shaft 50 when rotated in a first direction, whereas it is configured to freely rotate in the other direction relative to the shaft 50.

A second freewheel 56 is attached to the shaft 50 in the opposite end of that part of the shaft 50 that extends through the housing 74. The second freewheel 56 only engages the shaft 50 when rotated in the second direction, whereas it is configured to freely rotate in the first direction relative to the shaft 50.

The first freewheel 54 is connected to a toothed wheel 61 by means of a toothed belt 62. Accordingly, rotation of the first freewheel 54 will cause rotation of the toothed wheel 61. The toothed wheel 61 is attached to a shaft 72' mounted by means of a bearing 52" attached to a bearing housing 64.

The second freewheel 56 attached to the shaft 50 has a free rotational direction opposite directed than the first freewheel 54. The second freewheel 56 attached to a shaft 50 is connected to a toothed wheel 60' by means of a toothed belt 62'. Accordingly, rotation of the second freewheel 56 will cause rotation of the toothed wheel 60' attached to the shaft 72.

A toothed wheel 60 is attached to the shaft 72. The toothed wheel 60 engages a toothed wheel 61' attached to the shaft 72'. Accordingly, when the shaft 50 is rotated in one direction, one of the freewheels 54, 56 will transfer torque to the shaft 72 for driving the generator 68 through the gear unit 66. When the shaft 50 is rotated in the opposite direction, the other freewheel 54, 56 will transfer torque to the shaft 72 through the gear unit 66.

In some embodiments, the gear unit 66 may be omitted so that the shaft 72 rotates with the same rotational speed as the shaft of the generator 68.

The rotational converting device 76 may be applied in embodiments in which the energy converting device 2 according to the invention is applied to drive a pump.

LIST OF REFERENCE NUMERALS

2 Energy converting device
4 Sail member
6 Pendulum rod
8 Frame
10 Pendulum bob
12 Generator
14 Secondary pendulum 15 Wire
18 Bearing unit
20 Main pendulum
22 Bearing unit
24 Rod
26 Wheel
28 Engagement structure
30 Pendulum bob
32 Pendulum rod
34 Groove
36 Shaft
38 Fixture
40 Ring (square)
42, 44 Pivot
46 Reinforcement structure
48 Pivot
50 Shaft
52, 52', 52" Bearing
54 Freewheel
56 Freewheel
58 Support structure
60, 60', 61, 61' Toothed wheel
62, 62' Toothed belt 64 Bearing housing
66 Gear unit
68 Generator
70 Shaft
72, 72' Shaft
74 Housing
76 Rotational converting device
I, II, III, IV Sail segment
X, Y Axis
$S_1, S_2, S_3, S_4$ Section
A, B, C Position
$F, F_1, F_2, F_3, F_4$ Force

The invention claimed is:

1. A wind-driven energy converting device comprising a main pendulum comprising a pendulum bob attached to a pendulum rod, wherein a sail member is attached to the pendulum rod of the main pendulum in a higher position than the pendulum bob of the main pendulum, wherein the main pendulum is suspended in a frame by a bearing unit, wherein the bearing unit comprises two pivots, each one of the two pivots extending along one of two perpendicular horizontal axes (X, Y) and allowing the pendulum rod to swing about the two perpendicular horizontal axes (X, Y) at the same time, wherein the main pendulum is mechanically attached to at least one secondary pendulum by a connection structure, wherein the at least one secondary pendulum is connected to a driving shaft, and the motion of the main pendulum causes the at least one secondary pendulum to move, which causes the driving shaft to rotate.

2. The wind-driven energy converting device of claim 1, wherein the connection structure is a wire or string.

3. The wind-driven energy converting device of claim 1, wherein the wind-driven energy converting device comprises a frame comprising a plurality of rods.

4. The wind-driven energy converting device of claim 3, wherein the pendulum rod of the main pendulum is suspended to the frame by the bearing unit of the main pendulum being attached to two rods of the frame.

5. The wind-driven energy converting device of claim 1, wherein the wind-driven energy converting device comprises a generator mechanically connected to the driving shaft being configured to generate electrical energy upon the swinging of the main pendulum.

6. The wind-driven energy converting device of claim 1, wherein the wind-driven energy converting device comprises an engagement structure configured to engage with the driving shaft.

7. The wind-driven energy converting device of claim 1, wherein the wind-driven energy converting device comprises a sail member having four sail segments.

8. The wind-driven energy converting device of claim 3, wherein the wind-driven energy converting device comprises a plurality of sections each provided with a secondary pendulum comprising a pendulum bob suspended to the frame by a pendulum rod swingably attached to the frame by a bearing unit, wherein the plurality of sections protrude radially from the main pendulum, wherein the main pendulum is located in the center of the plurality of sections.

9. The wind-driven energy converting device of claim 3, wherein the wind-driven energy converting device comprises a bearing unit by which the main pendulum is attached to the frame, said bearing unit comprising a ring swingably attached to the pendulum rod of the main pendulum by one of the two pivots extending at least partly through the pendulum rod and being attached to the ring, wherein the ring is swingably attached to the frame by the other one of the two pivots.

10. The wind-driven energy converting device of claim 6 further comprising a wheel attached to the drive shaft, wherein the engagement structure engages with an annular groove of the wheel.

11. The wind-driven energy converting device of claim 1, wherein the sail member is detachably attached to the pendulum rod of the main pendulum.

12. The wind-driven energy converting device of claim 1, wherein the sail member is slidably attached to the pendulum rod of the main pendulum.

13. The wind-driven energy converting device of claim 1, wherein the vertical position of the sail member can be adjusted.

14. The wind-driven energy converting device of claim 1, wherein the sail member comprises two sail segments.

15. The wind-driven energy converting device of claim 1, wherein the sail member is rotatably attached to the pendulum rod of the main pendulum in order for the sail member to rotate based on a wind direction.

16. The wind-driven energy converting device of claim 7, wherein each one of the four sail segments defines an aperture.

17. The wind-driven energy converting device of claim 14, wherein each one of the two sail segments defines an aperture.

* * * * *